(12) United States Patent
Sheh et al.

(10) Patent No.: US 6,693,764 B1
(45) Date of Patent: Feb. 17, 2004

(54) METHOD AND DISK DRIVE FOR IMPROVING HEAD POSITION ACCURACY DURING TRACK FOLLOWING THROUGH REAL-TIME IDENTIFICATION OF EXTERNAL VIBRATION

(75) Inventors: Edgar D. Sheh, San Jose, CA (US); Hemant Melkote, San Jose, CA (US); Vinay K. Agarwal, Cupertino, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 329 days.

(21) Appl. No.: 09/775,256

(22) Filed: Jan. 31, 2001

(51) Int. Cl.$^7$ ............................................... G11B 5/596
(52) U.S. Cl. ................................................... 360/77.08
(58) Field of Search ............................... 360/75, 77.02, 360/77.08

(56) References Cited

U.S. PATENT DOCUMENTS

| | | | | |
|---|---|---|---|---|
| 5,550,685 A | * | 8/1996 | Drouin | 360/77.08 |
| 5,608,586 A | * | 3/1997 | Sri-Jayantha et al. | 360/77.04 |
| 5,654,840 A | | 8/1997 | Patton et al. | |
| 5,663,847 A | * | 9/1997 | Abramovitch | 360/77.02 |
| 5,774,299 A | * | 6/1998 | Baum et al. | 360/77.08 |
| 6,049,441 A | * | 4/2000 | Ottesen | 360/77.04 |
| 6,493,172 B1 | * | 12/2002 | Morris et al. | 360/77.02 |
| 6,496,320 B1 | * | 12/2002 | Liu | 360/75 |
| 2002/0034036 A1 | * | 3/2002 | Sri-Jayantha et al. | 360/77.02 |

* cited by examiner

*Primary Examiner*—Andrew L. Sniezek
(74) *Attorney, Agent, or Firm*—Milad G. Shara, Esq.; Robroy R. Fawcett, Esq.

(57) ABSTRACT

The present invention may be embodied in a method and a disk drive for improving head position accuracy during track following through real-time identification of external vibration. A selected track is followed using a servo control loop having a nominal gain and being responsive to position error signal samples generated based on a difference between head position samples and a reference head position value. A spectral power value within a predetermined frequency band is determined from a sequence of the position error signal samples. If a property of the spectral power value exceeds a threshold, the gain of the servo control loop is increased within the predetermined frequency band to attenuate the effect of external vibration on the position of the head over the selected track during track following.

18 Claims, 6 Drawing Sheets

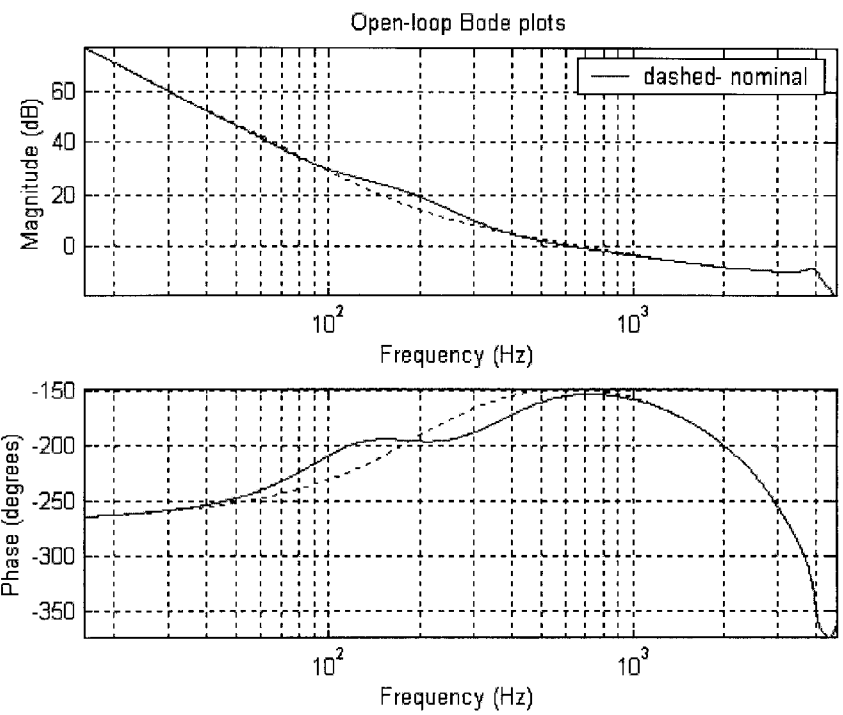
FIG. 7A
FIG. 7B
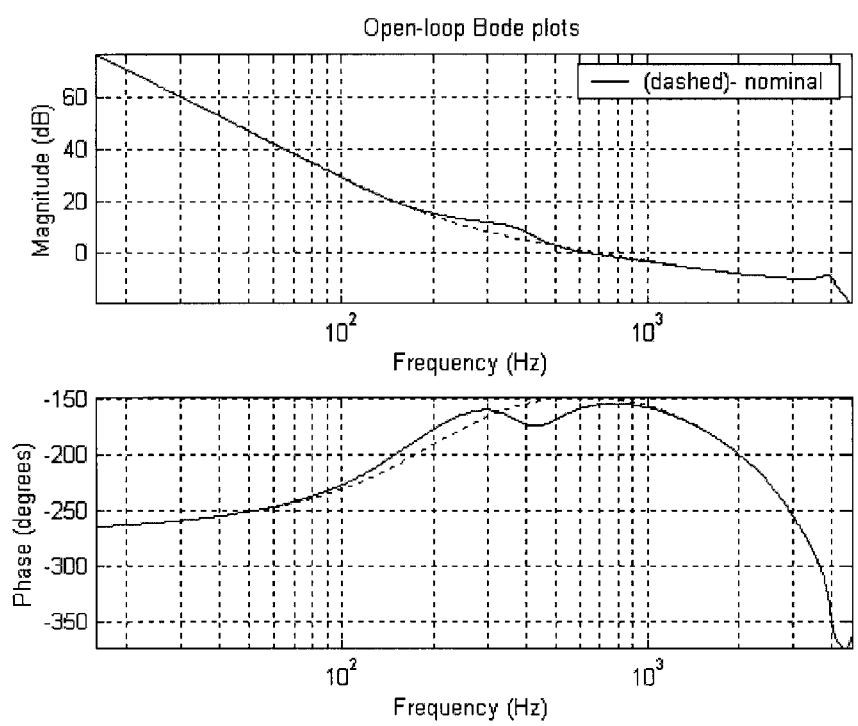
FIG. 8A
FIG. 8B

METHOD AND DISK DRIVE FOR IMPROVING HEAD POSITION ACCURACY DURING TRACK FOLLOWING THROUGH REAL-TIME IDENTIFICATION OF EXTERNAL VIBRATION

BACKGROUND OF THE INVENTION

1. Field of the Invention

The present invention relates to disk drives and more particularly to a technique for improving head position accuracy during track following.

2. Description of the Prior Art

In order to remain competitive, disk drive manufacturers must continually provide increased data storage capacity while rigidly controlling disk drive manufacturing cost. One key to increased storage capacity is increased track density, often expressed as tracks per inch or TPI. Market demand for increased storage capacity has pushed disk drive designers to increase the TPI of disk drives, thereby increasing the likelihood that an external vibration may undesirably force the disk drive's read/write head over an adjacent track during track following.

Accordingly, there exists a need for a method that enables a disk drive to minimize the effect of external vibration on head position accuracy during track following without unnecessarily increasing the disk drive's manufacturing cost.

SUMMARY OF THE INVENTION

The present invention may be embodied in a method and a disk drive for improving head position accuracy during track following through real-time identification of external vibration. The method includes providing a plurality of concentric data tracks having data sectors and embedded servo sectors on a storage surface of a rotating disk, positioning the head over a selected track of the plurality of concentric data tracks, and generating head position signal samples based on the position of the head with respect to the track's servo sectors. Position error signal samples are generated based on a difference between the head position signal samples and a reference head position value. The selected track is followed using a servo control loop having a nominal gain and being responsive to the position error signal samples. A spectral power value within a predetermined frequency band is determined from a sequence of the position error signal samples. If a property of the spectral power value exceeds a threshold, the gain of the servo control loop is increased within the predetermined frequency band to attenuate the effect of external vibration on the position of the head over the selected track during track following.

In another embodiment of the invention, spectral power values may be determined for a plurality of frequency bands and the gain may be increased within at least one of the frequency bands if a property of the respective spectral power value exceeds a threshold. Further, the plurality of frequency bands may comprise a first frequency band having a frequency range between about 100 and 300 Hz and a second frequency band having a frequency range between about 300 and 500 Hz. Also, the property of the spectral power value may be based on a variance of the spectral power value.

BRIEF DESCRIPTION OF THE DRAWINGS

The accompanying drawings illustrate embodiments of the present invention and, together with the description, serve to explain the principles of the invention.

FIGS. 7A and 7B are open-loop Bode plots illustrating nominal response of the servo control loop and improved response at a first frequency range.

FIGS. 8A and 8B are open-loop Bode plots illustrating nominal response of the servo control loop and improved response at a second frequency range.

DETAILED DESCRIPTION

Figure 1:
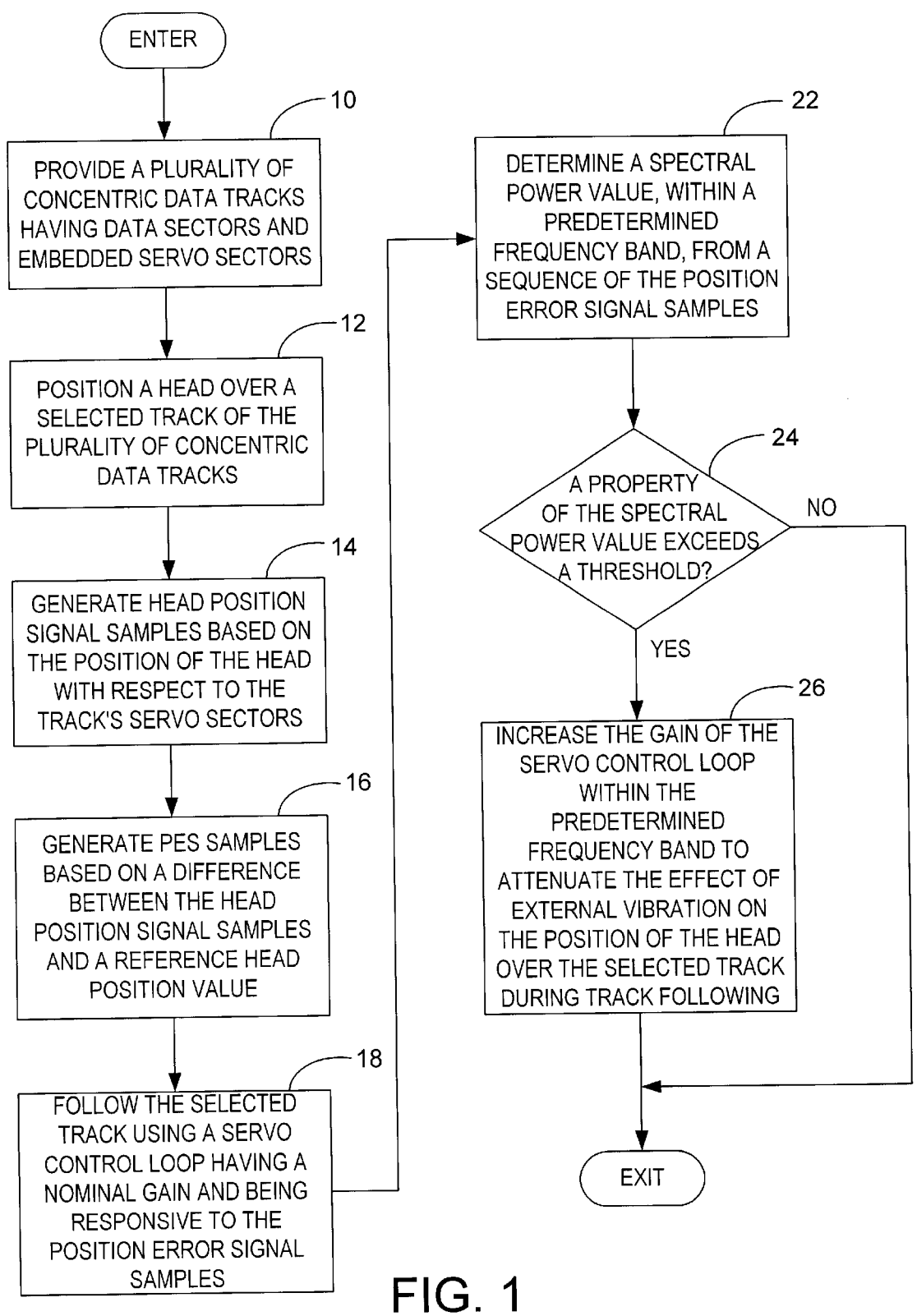
FIG. 1 is a flow diagram illustrating a method for improving head position accuracy in a disk drive during track following through real-time identification of external vibration, according to the present invention.
Figure 2:
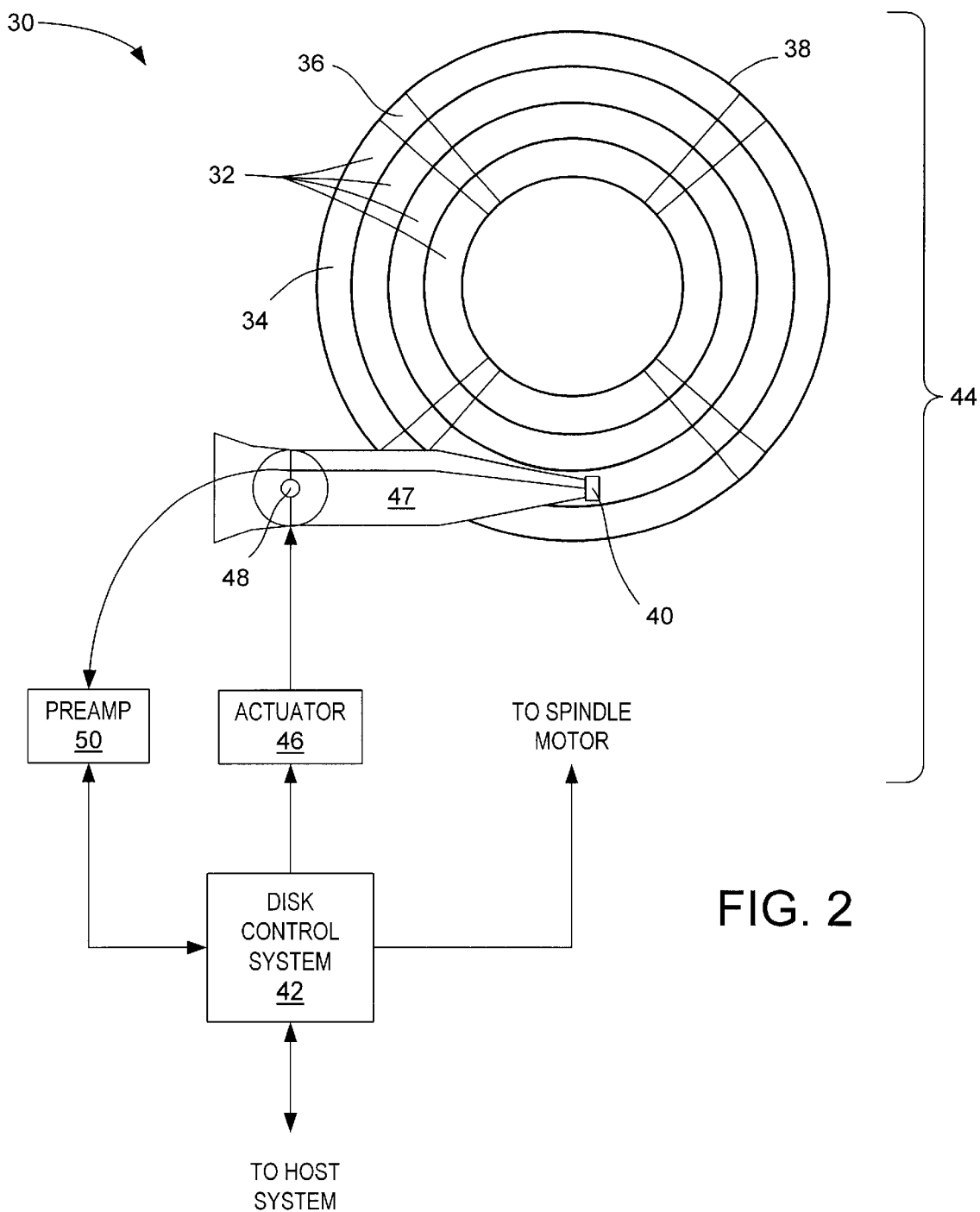
FIG. 2 is a block diagram of a disk drive having improved head position accuracy during track following through real-time identification of external vibration, according to the present invention.

With reference to FIGS. 1 and 2, the present invention may be embodied in a method (FIG. 1) for improving head position accuracy in a disk drive 30 (FIG. 2) during track following through real-time identification of external vibration. The method includes providing a plurality of concentric data tracks 32 having data sectors 34 and embedded servo sectors 36 on a storage surface of a rotating disk 38 (step 10), positioning the head 40 over a selected track of the plurality of concentric data tracks (step 12), and generating head position signal samples based on the position of the head with respect to the track's servo sectors (step 14). Position error signal samples are generated based on a difference between the head position signal samples and a reference head position value (step 16). The selected track is followed using a servo control loop having a nominal gain and being responsive to the position error signal samples (step 18). A spectral power value within a predetermined frequency band is determined from a sequence of the position error signal samples (step 22). If a property of the spectral power value exceeds a threshold (step 24), the gain of the servo control loop is increased within the predetermined frequency band to attenuate the effect of external vibration on the position of the head over the selected track during track following (step 26). Otherwise, the gain of the servo control loop remains at its existing value.

The disk drive 30 generally comprises a disk control system 42 and a head disk assembly (HDA) 44. The HDA includes the magnetic disk 38 having the plurality of concentric data tracks 32 recorded thereon, the head 40 for writing user data to or reading user data from a selected one of the data tracks in response to host command during a user operation of the disk drive, and an actuator 46 for positioning the head over the selected track. The head 40 in present disk drives comprises a giant magneto-resistive (GMR) read element and thin film inductive write element. The actuator is typically implemented as a voice coil motor (VCM) which rotates an actuator arm 47 about a pivot 48 in order to position the head radially over the disk in response to control signals from the disk control system.

In addition to the disk 38, the head 40, and the actuator 46, the HDA 44 includes a preamplifier 50 and a spindle motor (not shown) for rotating the disk. The head communicates with the disk control system 42 via the preamplifier. The disk control system also includes circuitry and processors that provide an intelligent disk control system interface between a host system (not shown) and the HDA for execution of read and write commands.

The disk control system 42 implements the servo control loop which causes the head 40 to follow a centerline of the selected track 32 in an operation generally referred to as "track following." During track following, the path of the head wanders about a track centerline. Typically, the disk control system attempts to limit the head wander to within a predetermined range defined by a "Track Misregistration" (TMR) budget.

Figure 3:
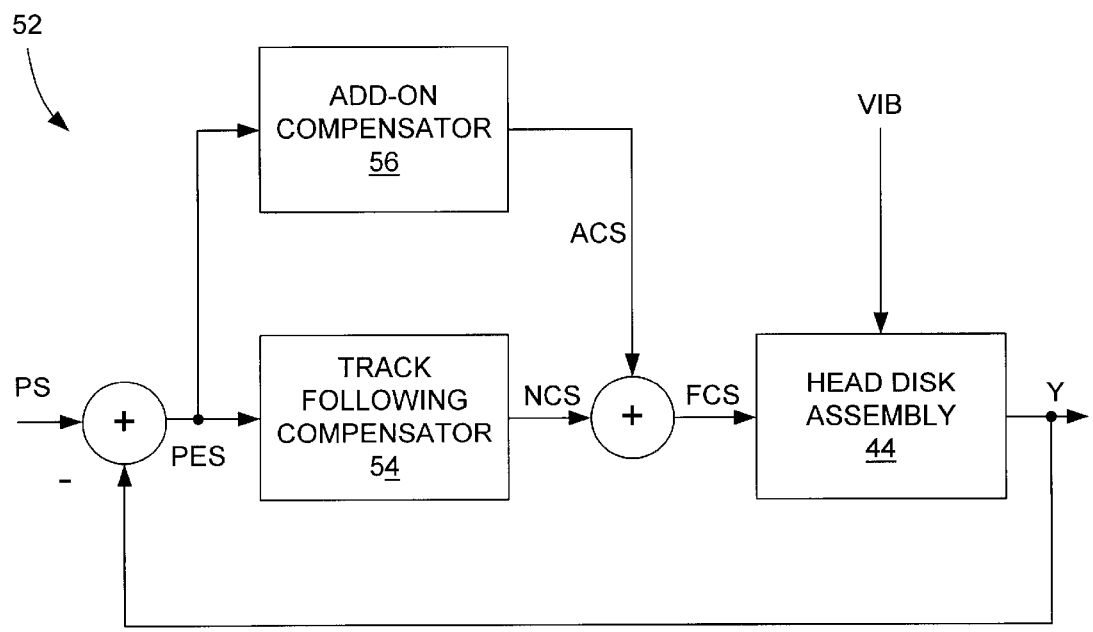
FIG. 3 is a block diagram of a servo control loop implemented by the disk drive of FIG. 2 for improving head position accuracy during track following.

A representative servo control loop 52 is shown in FIG. 3. The servo control loop may be implemented using a digital microprocessor and, accordingly, the signals described herein may represent digital samples. A track 32 is selected for track following by applying the reference head position value PS corresponding to the selected track at the input of the servo control loop. The position error signal PES is generated based on the difference between the reference head position value PS and the actual head position signal Y. The actual head position signal Y is measured as the head 40 passes over a servo sector 36 of the selected track. A track following compensator 54 processes the PES and generates a nominal control signal NCS for application to the actuator 46 of the HDA 44.

External vibration VIB or similar mechanical disturbance acting on the HDA 44 may force the head 40 away from the centerline of the selected track 32. If the external vibration is sufficiently continuous and periodic, the resulting force on the HDA may result in a component of the PES that is similarly continuous and periodic. The technique of the present invention attempts to identify the external vibration induced component of the PES and attenuate the effect of the external vibration using an add-on compensator 56.

Figure 4:
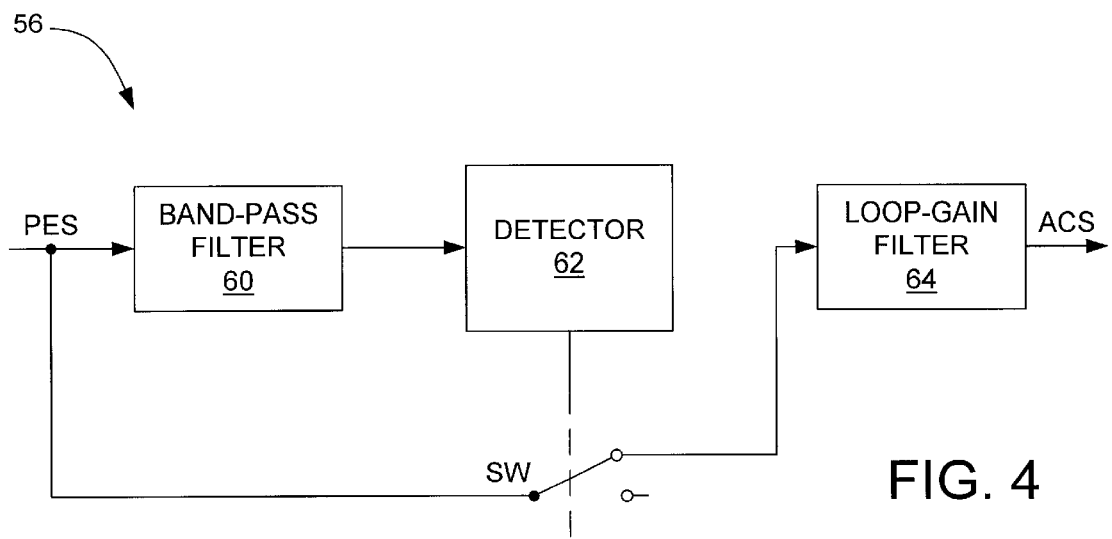
FIG. 4 is a block diagram of a first embodiment of an add-on compensator of the servo control loop of FIG. 3.

An embodiment of the add-on compensator 56 is shown in FIG. 4. The add-on compensator attempts to increase the gain of the servo control loop 52 within a frequency band that corresponds to the spectral power distribution of the external vibration. The add-on compensator includes a band-pass filter 60, a detector 62, a logic switch SW, and a loop-gain filter 64. The band-pass filter acts on the PES to determine the spectral power of the PES falling within the frequency range of the filter's pass band. The detector determines whether a property of the spectral power within the filter's frequency band exceeds a predetermined threshold. If the threshold is exceeded, the switch activates the loop-gain filter. The loop-gain filter processes the PES generating an add-on compensator signal ACS. The ACS is combined with the NCS to generate a track-following compensation signal FCS (FIG. 3). The FCS operates the actuator 46 to position the head 40 over the desired track 32.

Figure 5:
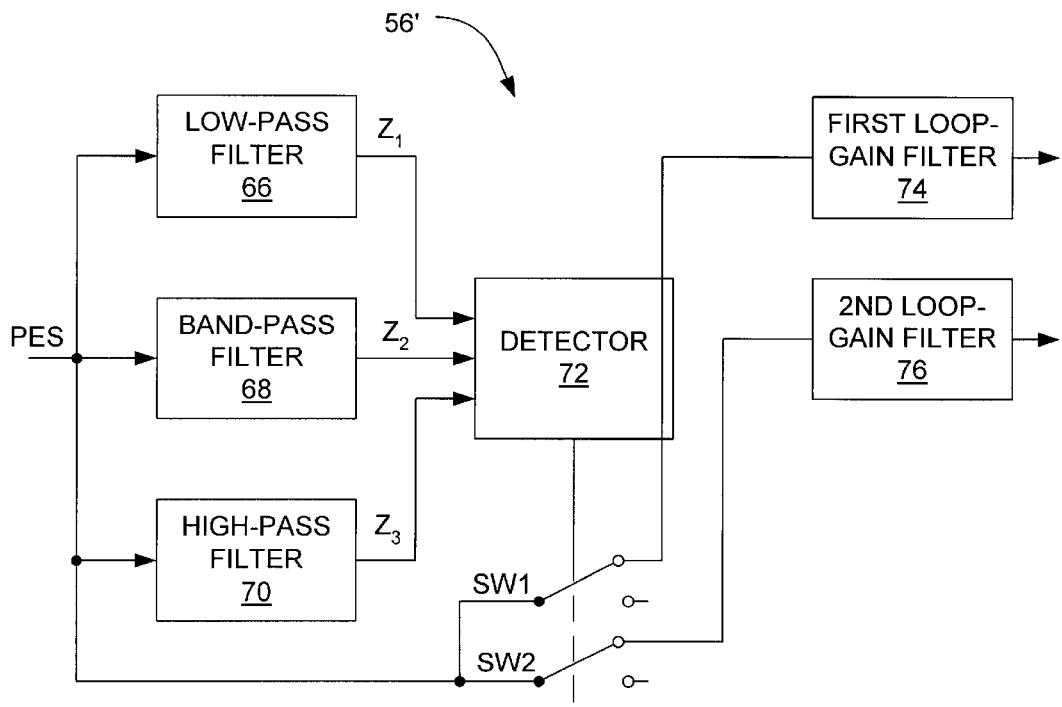
FIG. 5 is a block diagram of a second embodiment of an add-on compensator of the servo control loop of FIG. 3.

Another embodiment of the add-on compensator 56' having a plurality of distinct frequency bands is shown in FIG. 5. This add-on compensator increases the gain of the servo control loop 52 within selectable frequency bands that correspond to the spectral power distribution of the external vibration. The spectral power distribution of the external vibration is determined and identified using a second-order low-pass filter 66 and a second-order band-pass filter 68. An additional second-order high-pass filter 70 is provided for computation of a variance of the PES. All of the filters 66, 68, and 70, may be band-pass filters and the number of identification filters may be increased based on the desired identification resolution and available computational power. The spectral power of a representative external vibration experienced by a disk drive generally falls within a frequency range of about 0 to 500 hertz (Hz). Accordingly, the low-pass filter 66 may have a cut-off frequency of about 300 Hz, the band-pass filter may have a pass-band frequency range of about 300 to 600 Hz, and the high-pass filter may have a cut-off frequency of about 600 Hz. Based on the filter outputs, $Z_1$, $Z_2$ and $Z_3$, respectively, a detector 72 engages one of two add-on loop-gain filters, 74 and 76. The first loop-gain filter 74 may be a second-order band-pass filter having a pass-band frequency range of about 100 to 300 Hz and the second loop-gain filter 76 may be a second-order band-pass filter having a pass-band frequency range of about 300 to 500 Hz. The detector includes logic for determining which of the loop-gain filters to engage.

Alternatively, the add-on compensator 56' may use three identification filters, and corresponding loop-gain filters, covering the frequency ranges of 100 to 300 Hz, 300 to 400 Hz, and 400 to 500 Hz, or four identification filters covering the frequency ranges of 100 to 200 Hz, 200 to 300 Hz, 300 to 400 Hz, and 400 to 500 Hz. Accordingly, the add-on compensator may have a number of identification filters and corresponding loop gain filters covering a wide variety of equally-spaced or variably-space frequency ranges generally below 500 Hz.

Figure 6A:
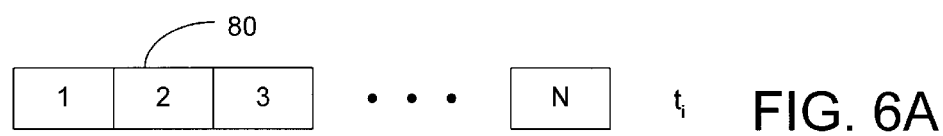
FIGS. 6A and 6B are schematic diagrams illustrating a moving window for calculating variances on position error signal samples.
Figure 6B:
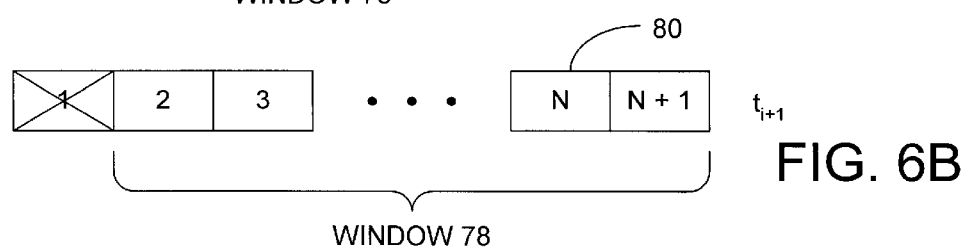

One logic design that is particularly advantageous for avoiding unnecessary switching uses moving window variance calculations of the PES which are compared with a baseline value. A moving window for variance calculations is described with reference to FIGS. 6A and 6B. A moving window of N samples (e.g., N=104) from the filter outputs are accumulated and a variance is calculated on the N samples at time $t_i$. When a next sample is accumulated at time $t_{i+1}$, the moving window shifts one sample and the earliest sample (sample number 1 in FIG. 6B) is discarded and the variance is calculated on the N samples within the shifted moving window. For each filter, an excursion $e_i$ from the baseline value $n_i$, is calculated as follows: $e_i = \text{Var}(Z_i) - n_i$, for i=1, 2, 3. The baseline values may be calculated, with no external vibration present, as the mean variances over several distinct windows (e.g., 1040 output samples, separated into 10 windows of 104 samples each). The excursions may be compared against corresponding thresholds. Each threshold may depend on a torque rejection curve of the disk drive and a window-to-window variation of variances calculated on the baseline windows.

If the threshold associated with either the low-pass filter 66 or the band-pass filter 68 is exceeded, the detector 72 may activate the respective switch, SW1 and: SW2, to activate the first loop-gain filter 74 and second loop-gain filter 76. However, if the overall excursion $e_3$ exceeds a threshold, the detector inhibits activation of the loop-gain filters to avoid unnecessary switching when the filters may not be noticeably effective.

Open-loop Bode plots that illustrate the effect of the first loop-gain filter 74 on the response of the servo control loop 52 are shown in FIGS. 7A and 7B, and that illustrate the effect of the second loop-gain filter 76 are shown in FIGS. 8A and 8B. The dashed lines in the plots indicate the nominal gain and phase responses and the solid lines indicate the gain and phase responses when the respective loop gain filter is activated. The plots indicate that the loop-gain is increased within the frequency range of the filter's pass band without appreciably affecting the stability margins of the servo control loop.

Figure 9:
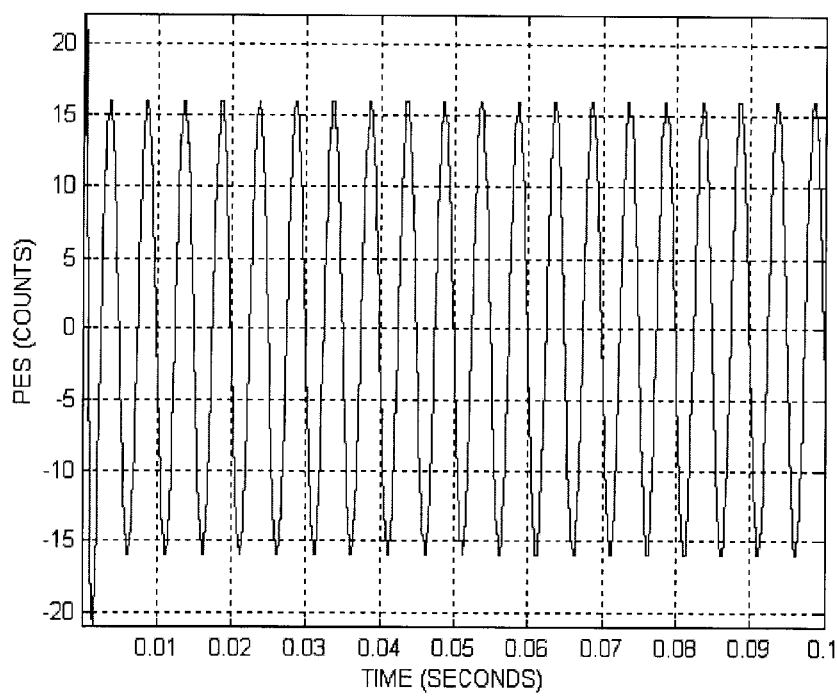
FIG. 9 is a graph illustrating nominal position error signal variance versus time.
Figure 10:
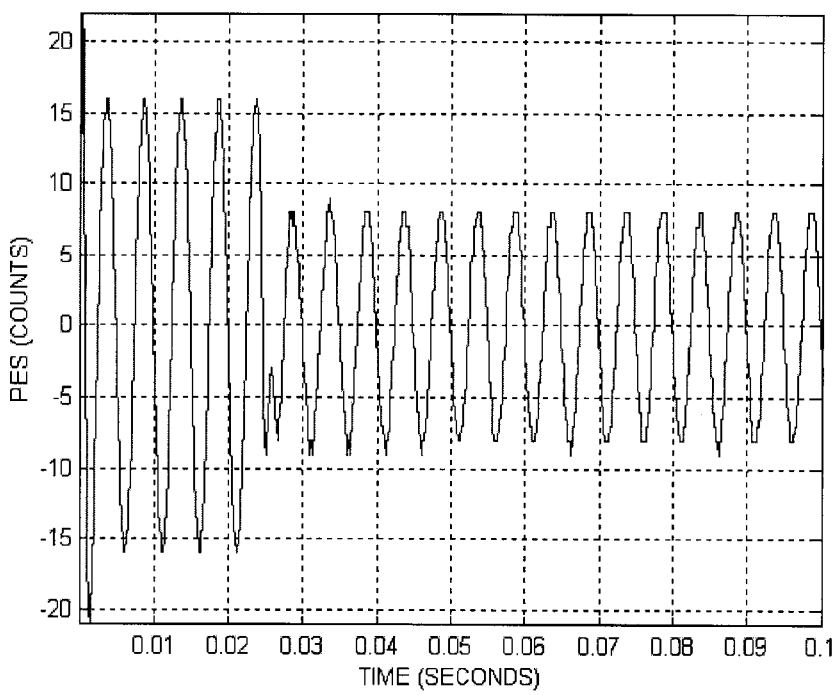
FIG. 10 is a graph illustrating improved position error signal variance versus time, according to the present invention.

Empirical studies have indicated that the technique of the invention may improve the PES variance by 10–15% in the case of random external vibration. As indicated by FIGS. 9 and 10, empirical studies have indicated that the PES variance may be improved by 54% for a sinusoidal vibration having a frequency of about 200 Hz. FIG. 9 illustrates the PES variance before the first add-on loop-gain filter 74 is engaged and FIG. 10 illustrates the improvement in the PES variation as the first add-on filter is engaged.

We claim:

1. A method for improving head position accuracy in a disk drive during track following through real-time identification of external vibration, the method comprising the steps of:

provinding a plurality of concentric data tracks on a storage surface of a rotating disk, the tracks having data sectors and embedded servo sectors;

positioning the head over a selected track of the plurality of concentric data tracks;

generating head position signal samples based on the position of the head with respect to the track's servo sectors;

generating position error signal samples based on a difference between the head position signal samples and a reference head position value;

following the selected track using a servo control loop having a nominal gain and being responsive to the position error signal samples;

determining a sequence of spectral power values, within a predetermined frequency band, from a sequence of the position error signal samples;

accumulating a predetermined number of the spectral power values;

calculating a variance of the accumulated spectral power values; and increasing the gain of the servo control loop within the predetermined frequency band, if a property of the variance of the accumulated spectral power values exceeds a threshold, to attenuate the effect of external vibration on the position of the head over the selected track during track following.

2. A method for improving head position accuracy as defined in claim 1, wherein the property of the variance of the accumulated spectral power values is based on an excursion of the variance of the accumulated spectral power values from a baseline variance value determined with no external vibration present.

3. A disk drive having improved head position accuracy during track following trough real-time identification of external vibration, comprising:

a rotating disk having a storage surface containing a plurality of concentric data tacks having data sectors and embedded servo sectors;

a transducer head;

an actuator for positioning the head over a selected track of the plurality of concentric data tracks in response to a control signal;

a servo controller for generating head position samples based on the position of the head with respect to the track's servo sector, for generating position error signal samples based on a difference between the head position signal samples and a reference head position value, and for generating the control signal for following the selected track using a servo control loop having a nominal gain and being responsive to the position error signal;

a filter for determining a sequence of spectral power values, within a predetermined frequency band, from a sequence of the position error signal samples;

means for accumulating a predetermined number of the spectral power values in the sequence;

means for calculating a variance of the accumulated spectral power values;

a detection circuit for determining if a property of the variance of the accumulated spectral power values exceeds a threshold; and a gain circuit coupled to the detection circuit for increasing the gain of the servo control loop within the predetermined frequency band, if the property of the variance of the accumulated spectral power values exceeds the threshold, to attenuate the effect of external vibration on the position of the head over the selected track during track following.

4. A disk drive having improved improving head position accuracy as defined in claim 3, wherein the property of the variance of the accumulated spectral power values is based on an excursion of the variance of the accumulated spectral power values from a baseline variance value determined with no external vibration present.

5. A method for improving head position accuracy in a disk drive during track following through real-time identification of external vibration, the method comprising the steps of:

providing a plurality of concentric data tracks on a storage surface of a rotating disk, the tracks having data sectors and embedded servo sectors;

positioning the head over a selected track of the plurality of concentric data tracks;

generating head position signal samples based on the position of the head with respect to the track's servo sectors;

generating position error signal samples based on a difference between the head position signal samples and a reference head position value;

following the selected track using a servo control loop having a nominal gain and being responsive to the position error signal samples;

determining a plurality of spectral power values, within a respective plurality of predetermined vibration frequency bands, from a sequence of the position error signal samples;

determining a sequence of spectral power values, within a shock frequency band, from the sequence of the position error signal samples, wherein the shock frequency band is exclusive of the plurality of predetermined vibration frequency bands;

calculating a first variance for a predetermined number of the spectral power values in the sequence of the spectral power values; and increasing the gain of the servo control loop within at least one of the predetermined vibration frequency bands, if a property of the spectral power values within the respective predetermined vibration frequency band exceeds a vibration threshold and if a property of the first variance is below a shock threshold, to attenuate the effect of external vibration on the position of the head over the selected track during track following.

6. A method for improving head position accuracy as defined in claim 5, wherein the property of the spectral power values within the respective predetermined vibration frequency band is based on an excursion of a vibration variance of the respective spectral power values from a baseline variance value for the respective predetermined vibration frequency band determined with no external vibration present.

7. A method for improving head position accuracy as defined in claim 5, wherein the property of the first variance is based on an excursion of the first variance from a baseline variance value for the shock frequency band determined with no external vibration present.

8. A method for improving head position accuracy in a disk drive during track following through real-time identification of external vibration, the method comprising the steps of:
 providing a plurality of concentric data tracks on a storage surface of a rotating disk, the tracks having data sectors and embedded servo sectors;
 positioning the head over a selected track of the plurality of concentric data tracks;
 generating head position signal samples based on the position of the head with respect to the track's servo sectors;
 generating position error signal samples based on a difference between the head position signal samples and a reference head position value;
 following the selected track using a servo control loop having a nominal gain and being responsive to the position error signal samples;
 determining a plurality of spectral power values, within a respective plurality of predetermined frequency bands, from a sequence of the position error signal samples, wherein the plurality of frequency bands comprise a first frequency band having a frequency range between about 100 and 300 Hz and a second frequency band having a frequency range between about 300 and 500 Hz; and
 increasing the gain of the servo control loop within at least one of the predetermined frequency bands, if a property of the spectral power value within the respective predetermined frequency band exceeds a threshold, to attenuate the effect of external vibration on the position of the head over the selected track during track following.

9. A method for improving head position accuracy in a disk drive during track following through real-time identification of external vibration, the method comprising the steps of:
 providing a plurality of concentric data tracks on a storage surface of a rotating disk, the tracks having data sectors and embedded servo sectors;
 positioning the head over a selected track of the plurality of concentric data tracks;
 generating head position signal samples based on the position of the head with respect to the track's servo sectors;
 generating position error signal samples based on a difference between the head position signal samples and a reference head position value;
 following the selected track using a servo control loop having a nominal gain and being responsive to the position error signal samples;
 determining a plurality of spectral power values, within a respective plurality of predetermined frequency bands, from a sequence of the position error signal samples, wherein the plurality of frequency bands comprise a first frequency band having a frequency range between about 100 and 200 Hz a second frequency band having a frequency range between about 200 and 300 Hz, a third frequency band having a frequency range between about 300 and 400 Hz, and a fourth frequency band having a frequency range between about 400 and 500 Hz; and
 increasing the gain of the servo control loop within at least one of the predetermined frequency bands, if a property of the spectral power value within the respective predetermined frequency band exceeds a threshold, to attenuate the effect of external vibration on the position of the head over the selected track during track following.

10. A method for improving head position accuracy in a disk drive during track following through real-time identification of external vibration, the method comprising the steps of:
 providing a plurality of concentric data tracks on a storage surface of a rotating disk, the tracks having data sectors and embedded servo sectors;
 positioning the head over a selected track of the plurality of concentric data tracks;
 generating head position signal samples based on the position of the head with respect to the track's servo sectors;
 generating position error signal samples based on a difference between the head position signal samples and a reference head position value;
 following the selected track using a servo control loop having a nominal gain and being responsive to the position error signal samples;
 determining a plurality of spectral power values, within a respective plurality of predetermined frequency bands, from a sequence of the position error signal samples, wherein the plurality of frequency bands comprise a first frequency band having a frequency range below about 300 Hz, a second frequency band having a frequency range between about 300 and 400 Hz, and a third frequency band having a frequency range between about 400 and 500 Hz; and
 increasing the gain of the servo control loop within at least one of the predetermined frequency bands, if a property of the spectral power value within he respective predetermined frequency band exceeds a threshold, to attenuate the effect of external vibration on the position of the head over the selected track during track following.

11. A method for improving head position accuracy in a disk drive during track following through real-time identification of external vibration, the method comprising the steps of:
 providing a plurality of concentric data tracks on a storage surface of a rotating disk, the tracks having data sectors and embedded servo sectors;
 positioning the head over a selected track of the plurality of concentric data tracks;
 generating head position signal samples based on the position of the head with respect to the track's servo sectors;
 generating position error signal samples based on a difference between the head position signal samples and a reference head position value;

following the selected track using a servo control loop having a nominal gain and being responsive to the position error signal samples;

determining a plurality of spectral power values, within a respective plurality of predetermined frequency bands, from a sequence of the position error signal samples, wherein the plurality of frequency bands are in frequency ranges below about 500 Hz with at least one frequency band being within a frequency range between about 200 Hz and 500 Hz; and increasing the gain of the servo control loop within at least one of the predetermined frequency bands, if a property of the spectral power value within the respective predetermined frequency band exceeds a threshold, to attenuate the effect of external vibration on the position of the head over the selected track during track following.

12. A disk drive having improved head position accuracy dung track following through real-time Identification of external vibration, comprising:

a rotating disk having a storage surface containing a plurality of concentric data tracks having data sectors and embedded servo sectors;

a transducer head;

an actuator for positioning the head over a selected track of the plurality of concentric data tracks in response to a control signal;

a servo controller for generating head position samples based on the position of the head with respect to the track's servo sector, for generating position error signal samples based on a difference between the head position signal samples and a reference head position value, and for generating the control signal for following the selected track using a servo control loop having a nominal gain and being responsive to the position error signal;

a plurality of vibration filters for determining spectral power values, within a respective plurality of predetermined vibration frequency bands, from a sequence of the position error signal samples;

a shock filter for determining a sequence of spectral power values, within a shock frequency band, from the sequence of the position error signal samples, wherein the shock frequency band is exclusive of the plurality of predetermined vibration frequency bands;

a detection circuit coupled to the vibration filters for determining if a property of the spectral power values exceeds a vibration threshold;

means for calculating a first variance for a predetermined number of the spectral power values in the sequence of the spectral power values;

a detection circuit coupled to the shock filter for determining if a property of the first variance exceeds a shock threshold; and a gain circuit coupled to the detection circuit for increasing the gain of the servo control loop within at least one of the predetermined vibration frequency bands, if a property of the spectral power value within the respective predetermined vibration frequency band exceeds the vibration threshold and if a property of the first variance is below the shock threshold, to attenuate the effect of external vibration on the position of the head over the selected track during track following.

13. A disk drive having improved head position accuracy as defined in claim 12, wherein the property of the spectral power values within the respective predetermined vibration frequency band is based on an excursion of a vibration variance of the respective spectral power values from a baseline variance value for the respective predetermined vibration frequency band determined with no external vibration present.

14. A disk drive having improved head position accuracy as defined in claim 12, wherein the property of the first variance is based on an excursion of the first variance from a baseline variance value for the shock frequency band determined with no external vibration present.

15. A disk drive having improved head position accuracy during track following through real-time identification of external vibration, comprising:

a rotating disk having a storage surface containing a plurality of concentric data tracks having data sectors and embedded servo sectors;

a transducer head;

an actuator for positioning the head over a selected track of the plurality of concentric data tracks in response to a control signal;

a servo controller for generating head position samples based on the position of the head with respect to the tracks servo sector, for generating position error signal samples based on a difference between the head position signal samples and a reference head position value, and for generating the control signal for following the selected track using a servo control loop having a nominal gain and being responsive to the position error signal;

a plurality of filters for determining spectral power values, within respective predetermined frequency bands, from a sequence of the position error signal samples, wherein the plurality of frequency bands comprise a first frequency band having a frequency range between about 100 and 300 Hz and a second frequency band having a frequency range between about 300 and 500 Hz;

a detection circuit coupled to the filters for determining if the spectral power values exceeds a threshold; and a gain circuit coupled to the detection circuit for increasing the gain of the servo control loop within at least one of the predetermined frequency bands, if a property of the spectral power value within the respective predetermined frequency band exceeds a threshold, to attenuate the effect of external vibration on the position of the head over the selected track during track following.

16. A disk drive having improved head position accuracy during track following through real-time identification of external vibration, comprising:

a rotating disk having a storage surface containing a plurality of concentric data tracks having data sectors and embedded servo sectors;

a transducer head;

an actuator for positioning the head over a selected track of the plurality of concentric data tracks in response to a control signal;

a servo controller for generating head position samples based on the position of the head with respect to the traces servo sector, for generating position error signal samples based on a difference between the head position signal samples and a reference head position value, and for generating the control signal for following the selected track using a servo control loop having a nominal gain and being responsive to the position error signal;

a plurality of filters for determining spectral power values, within respective predetermined frequency bands, from a sequence of the position error signal samples, wherein the plurality of frequency bands comprise a first frequency band having a frequency range between about 100 and 200 Hz, a second frequency band having a frequency range between about 200 and 300 Hz, a third frequency band having a frequency range between about 300 and 400 Hz, and a fourth frequency band having a frequency range between about 400 and 500 Hz;

a detection circuit coupled to the filters for determining if the spectral power values exceeds a threshold; and a gain circuit coupled to the detection circuit for increasing the gain of the servo control loop within at least one of the predetermined frequency bands, if a property of the spectral power value within the respective predetermined frequency band exceeds a threshold, to attenuate the effect of external vibration on the position of the head over the selected track during track following.

17. A disk drive having improved head position accuracy during track following through real-time identification of external vibration, comprising:

a rotating disk having a storage surface containing a plurality of concentric data tracks having data sectors and embedded servo sectors;

a transducer head;

an actuator for positioning the head over a selected track of the plurality of concentric data tracks in response to a control signal;

a servo controller for generating head position samples based on the position of the head with respect to the track's servo sector, for generating position error signal samples based on a difference between the head position signal samples and a reference head position value, and for generating the control signal for following the selected track using a servo control loop having a nominal gain and being responsive to the position error signal;

a plurality of filters for determining spectral power values, within respective predetermined frequency bands, from a sequence of the position error signal samples, wherein the plurality of frequency bands comprise a first frequency band having a frequency range below about 300 Hz, a second frequency band having a frequency range between about 300 and 400 Hz, and a third frequency band having a frequency range between about 400 and 500 Hz;

a detection circuit coupled to the filters for determining if the spectral power values exceeds a threshold; and a gain circuit coupled to the detection circuit for increasing the gain of the servo control loop within at least one of the predetermined frequency bands, if a property of the spectral power value within the respective predetermined frequency band exceeds a threshold, to attenuate the effect of external vibration on the position of the head over the selected track during track following.

18. A disk drive having improved head position accuracy during track following through real-time identification of external vibration, comprising:

a rotating disk having a storage surface containing a plurality of concentric data tracks having data sectors and embedded servo sectors;

a transducer head;

an actuator for positioning the head over a selected track of the plurality of concentric data tracks in response to a control signal;

a servo controller for generating head position samples based on the position of the head with respect to the track's servo sector, for generating position error signal samples based on a difference between the head position signal samples and a reference head position value, and for generating the control signal for following the selected track using a servo control loop having a nominal gain and being responsive to the position error signal;

a plurality of filters for determining spectral power values, within respective predetermined frequency bands, from a sequence of the position error signal samples, wherein the plurality of frequency bands are in frequency ranges below about 500 Hz with at least one frequency band being within a frequency range between about 200 Hz and 500 Hz;

a detection circuit coupled to the filters for determining if the spectral power values exceeds a threshold; and a gain circuit coupled to the detection circuit for increasing the gain of the servo control loop within at least one of the predetermined frequency bands, if a property of the spectral power value within the respective predetermined frequency band exceeds a threshold, to attenuate the effect of external vibration on the position of the head over the selected track during track following.

* * * * *